US 011724762B2

(12) United States Patent
Santucci et al.

(10) Patent No.: US 11,724,762 B2
(45) Date of Patent: Aug. 15, 2023

(54) MOTORCYCLE WITH OBSTACLE SENSOR

(71) Applicant: PIAGGIO & C. SPA, Pontedera (IT)

(72) Inventors: Mario Donato Santucci, Pontedera (IT); Onorino Di Tanna, Pontedera (IT)

(73) Assignee: PIAGGIO & C. S.P.A., Pontedera (IL)

( * ) Notice: Subject to any disclaimer, the term of this patent is extended or adjusted under 35 U.S.C. 154(b) by 0 days.

(21) Appl. No.: 16/322,603

(22) PCT Filed: Aug. 4, 2017

(86) PCT No.: PCT/IB2017/054780
§ 371 (c)(1),
(2) Date: Feb. 1, 2019

(87) PCT Pub. No.: WO2018/025231
PCT Pub. Date: Feb. 8, 2018

(65) Prior Publication Data
US 2019/0176919 A1    Jun. 13, 2019

(30) Foreign Application Priority Data

Aug. 4, 2016  (IT) ......................... 102016000082299

(51) Int. Cl.
*B62J 6/01*    (2020.01)
*B62J 6/04*    (2020.01)
(Continued)

(52) U.S. Cl.
CPC .................. *B62J 6/26* (2020.02); *B60Q 1/38* (2013.01); *B60Q 1/44* (2013.01); *B60Q 1/46* (2013.01);
(Continued)

(58) Field of Classification Search
CPC ... B62J 6/001; B62J 6/04; B62J 27/00; B60Q 1/38; B60Q 1/44; B60Q 1/46;
(Continued)

(56) References Cited

U.S. PATENT DOCUMENTS 5,217,087 A * 6/1993 Ikegami ................. B62K 21/00
701/1
5,856,779 A * 1/1999 Friday ........................ B62J 6/16
340/472
(Continued)

FOREIGN PATENT DOCUMENTS

DE        102013224196 B3 * 11/2014    ........... G01S 15/931
JP           2014520027 A * 8/2014    ........... G01S 15/876
(Continued)

OTHER PUBLICATIONS

International Search Report for corresponding application PCT/IB2017/054780 filed Aug. 4, 2017; dated Nov. 7, 2017.
(Continued)

*Primary Examiner* — Mohamed Barakat
*Assistant Examiner* — Rufus C Point
(74) *Attorney, Agent, or Firm* — Cantor Colburn LLP

(57) ABSTRACT

A motorcycle including a motorcycle body having a front part, a tail part and a central part between the front part and the tail part front and rear wheels constrained to the motorcycle body (2,3,4), a traction engine constrained to the motorcycle body (2,3,4) and operatively connected to at least one of the wheels, at least one optical signalling device fixed to the motorcycle body arranged and oriented so as to be visible by a vehicle that is following the motorcycle, an electronic control unit of the optical signalling device operatively connected to the optical signalling device, an obstacle sensor fixed to the motorcycle body (2,3,4) and operatively connected to the electronic control unit, where the electronic control unit is adapted and configured to receive at least one output signal supplied by the obstacle sensor, verifying whether said output signal meets at least one logical activation condition and, in such case, turning on the optical signalling device to signal a risk of collision with the motorcycle to the vehicle which follows the motorcycle, and (Continued)

where the obstacle sensor is arranged and oriented so that the output signal supplied to the electronic control unit carries information correlated to the presence of obstacles placed in front of the motor cycle.

11 Claims, 2 Drawing Sheets

(51) Int. Cl.
| | |
|---|---|
| B62J 27/00 | (2020.01) |
| B60Q 1/52 | (2006.01) |
| B60Q 1/44 | (2006.01) |
| B62M 7/12 | (2006.01) |
| B60Q 1/46 | (2006.01) |
| B60Q 1/38 | (2006.01) |
| G01S 13/931 | (2020.01) |
| G01S 15/931 | (2020.01) |
| G01S 17/931 | (2020.01) |
| B62J 6/26 | (2020.01) |
| B60Q 1/50 | (2006.01) |
| B62J 6/045 | (2020.01) |

(52) U.S. Cl.
CPC .............. *B60Q 1/525* (2013.01); *B62J 6/01* (2020.02); *B62J 6/045* (2020.02); *B62M 7/12* (2013.01); *G01S 13/931* (2013.01); *G01S 15/931* (2013.01); *G01S 17/931* (2020.01); *G01S 2013/9323* (2020.01); *G01S 2013/9324* (2020.01); *G01S 2013/9325* (2013.01); *G01S 2013/93271* (2020.01); *G01S 2013/93272* (2020.01)

(58) Field of Classification Search
CPC ........ B60Q 1/525; B62M 7/12; G01S 13/931; G01S 15/931; G01S 17/9364; G01S 2013/9325; G01S 2013/9364; G01S 2013/9367; G01S 2013/9375; G01S 2013/9378
See application file for complete search history.

(56) References Cited

U.S. PATENT DOCUMENTS

| | | | | | |
|---|---|---|---|---|---|
| 6,044,321 | A * | 3/2000 | Nakamura | ............ | B60K 31/047 701/96 |
| 6,225,896 | B1 * | 5/2001 | Sendowski | ............ | B60Q 1/445 340/467 |
| 6,278,360 | B1 * | 8/2001 | Yanagi | ............ | B60Q 5/006 340/439 |
| 6,624,747 | B1 * | 9/2003 | Friederich | ............ | B60T 7/22 340/436 |
| 6,731,202 | B1 * | 5/2004 | Klaus | ............ | G01S 13/931 340/901 |
| 7,365,769 | B1 * | 4/2008 | Mager | ............ | G06V 20/58 348/148 |
| 7,375,627 | B2 * | 5/2008 | Johnson | ............ | B60Q 1/444 340/468 |
| 8,942,904 | B2 * | 1/2015 | Foerster | ............ | G08G 1/16 477/182 |
| 10,029,683 | B1 * | 7/2018 | Ginther | ............ | B60W 30/09 |
| 10,071,681 | B2 * | 9/2018 | Schleicher | ............ | B60Q 1/525 |
| 10,315,559 | B2 * | 6/2019 | Hammock | ............ | B60Q 1/445 |
| 10,377,308 | B2 * | 8/2019 | Savaresi | ............ | G01S 13/931 |
| 10,668,971 | B2 * | 6/2020 | Denholm | ............ | B62J 45/41 |
| 2003/0141966 | A1 * | 7/2003 | Strumolo | ............ | B60Q 1/535 340/903 |
| 2004/0165396 | A1 * | 8/2004 | Hatfield, Jr. | ............ | B62J 6/027 362/473 |
| 2009/0174573 | A1 * | 7/2009 | Smith | ............ | G08G 1/0962 340/905 |
| 2009/0254260 | A1 * | 10/2009 | Nix | ............ | G01S 15/10 348/148 |
| 2009/0265107 | A1 * | 10/2009 | Matsuno | ............ | G08G 1/166 701/301 |
| 2010/0256852 | A1 * | 10/2010 | Mudalige | ............ | G08G 1/164 701/24 |
| 2011/0010094 | A1 * | 1/2011 | Simon | ............ | B60W 30/16 701/301 |
| 2011/0234799 | A1 * | 9/2011 | Mueller | ............ | H04N 23/68 348/148 |
| 2013/0311075 | A1 * | 11/2013 | Tran | ............ | B60W 50/14 701/117 |
| 2015/0123781 | A1 * | 5/2015 | Mauderer | ............ | B60T 7/22 340/479 |
| 2015/0367176 | A1 * | 12/2015 | Bejestan | ............ | G09B 19/167 482/9 |
| 2016/0090037 | A1 * | 3/2016 | Tetsuka | ............ | B60Q 9/008 340/435 |
| 2016/0200274 | A1 * | 7/2016 | Kolatschek | ............ | B62J 27/20 180/274 |
| 2016/0214609 | A1 | 7/2016 | Yamaoka | | |
| 2017/0101147 | A1 * | 4/2017 | Hasegawa | ............ | B62J 6/027 |
| 2017/0139418 | A1 * | 5/2017 | Hiramatsu | ............ | A01B 69/008 |
| 2017/0354196 | A1 * | 12/2017 | Tammam | ............ | G08G 1/166 |
| 2018/0143628 | A1 * | 5/2018 | Samper | ............ | G05D 1/0061 |
| 2019/0248439 | A1 * | 8/2019 | Wang | ............ | B62K 11/10 |
| 2019/0283739 | A1 * | 9/2019 | Kim | ............ | G05D 1/0289 |

FOREIGN PATENT DOCUMENTS

| | | | | |
|---|---|---|---|---|
| JP | 2017074820 A | * | 4/2017 | ............ B60Q 1/346 |
| SG | 10201604920 Y | | 6/2016 | |

OTHER PUBLICATIONS

Written Opinion for corresponding application PCT/IB2017/054780 filed Aug. 4, 2017; dated Nov. 7, 2017.

* cited by examiner

MOTORCYCLE WITH OBSTACLE SENSOR

TECHNICAL FIELD

The present description relates to the technical field of motor vehicles, and in particular relates to a motorcycle comprising an obstacle sensor.

BACKGROUND

Lighting systems which allow the safe use of motorcycles have been fitted on motorcycles for a long time. Motorcycles are indeed provided with a headlight, a tail light, direction indicators, at least one brake light etc. The headlight makes it possible to illuminate an area of ground arranged in front of the motorcycle and to make the motorcycle visible to people placed in front of the motorcycle. The tail light allows vehicles behind the motorcycle to see the motorcycle. The brake light is used to signal braking in progress to the vehicles behind, in order to prevent collisions between said vehicles and the motorcycle or to reduce the risk of such collisions as much as possible. In particular, the brake light of a motorcycle is automatically activated when the driver actuates the brake level and/or the brake pedal of the motorcycle.

Motorcycles are subject to a risk of collision by the vehicles behind it more than other vehicles, such as cars, for example, for various reasons. For example, the braking system, and thus the brake light, may be activated in delay by the driver or even if activated in timely fashion such light however does not provide information on the braking intensity. Furthermore, in such cases, it is necessary to signal the presence of the motorcycle to a vehicle behind more efficiently, so as to prevent it from knocking over the motorcycle.

BRIEF SUMMARY

The description provides a motorcycle having an obstacle sensor which makes it possible to either overcome or at least partially reduce the problems of the prior art.

BRIEF DESCRIPTION OF THE DRAWINGS

The disclosure will be better understood by the following detailed description of its embodiments, made by way of example and consequently not limiting in any way to the accompanying drawings, wherein.

DETAILED DESCRIPTION

Figure 1:
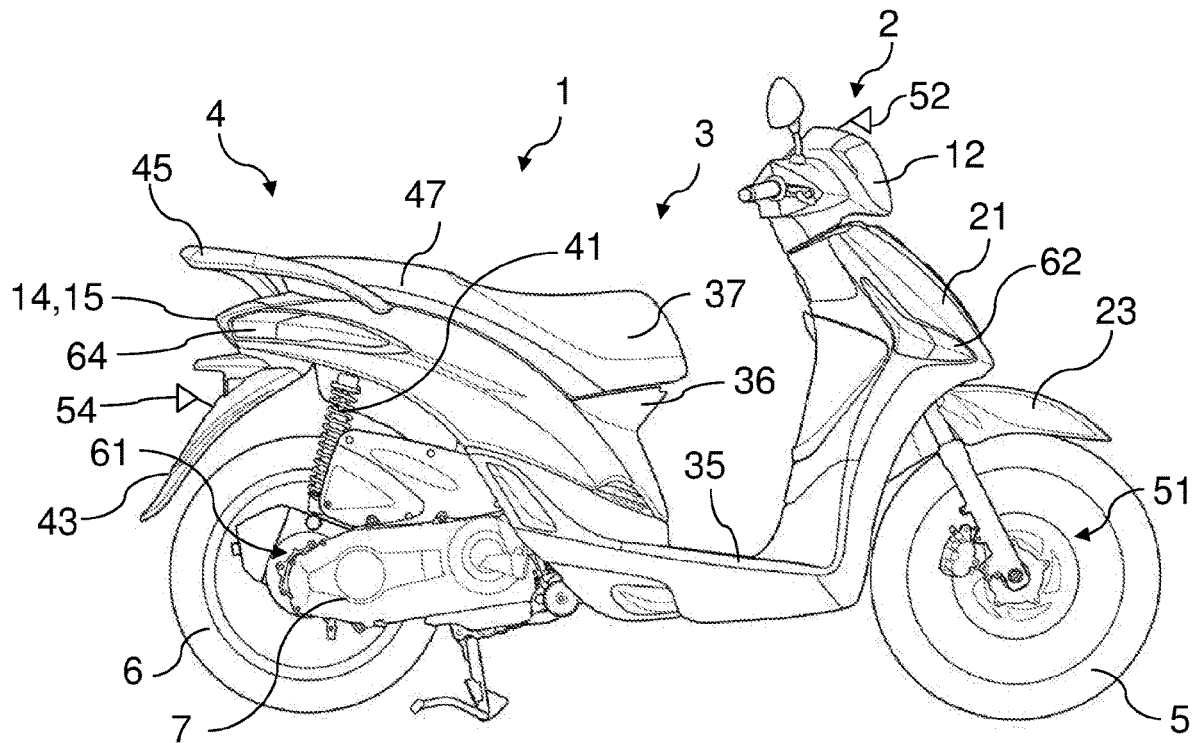
FIG. 1 shows a side view of a non-limiting embodiment of a motorcycle.
Figure 2:
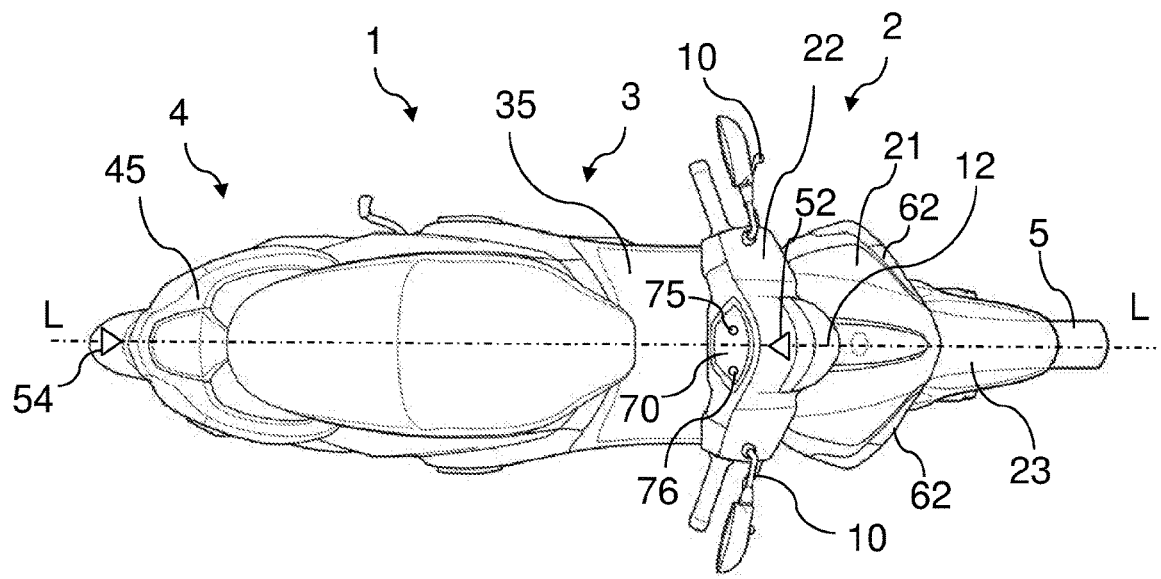
FIG. 2 shows a plan view of the motorcycle in FIG. 1.

Similar or equivalent elements in the accompanying figures are indicated by means of the same reference numerals.

An embodiment of a motorcycle 1 is shown in the accompanying figures, which in the particular example, without because of this introducing any limitation, comprises a two-wheel motorcycle 1, and in particular of a two-wheel scooter, having a front wheel 5 and a rear wheel 6.

Hereinafter in the present description, reference will be made to a generic motorcycle 1, hereby meaning the following description may apply in general to any type of motorcycle 1 of category L comprising:

a motorcycle body 2,3,4;

at least two wheels 5,6 constrained to the motorcycle body 2,3,4;

a traction engine 7, e.g. thermal or electric or hybrid, constrained to the motorcycle body 2,3,4 and operatively connected to at least one of the wheels 5,6.

For example, the aforesaid motorcycle 1 is a two-wheel motorcycle, such as for example a scooter or for motorbike, or a three-wheel tricycle of which at least two front wheels are steering and tilting, or a quadricycle with two pairs of tilting wheels, of which at least two are steering.

The motorcycle body 2,3,4 extends along a longitudinal axis L-L, which is parallel to the driving axis of the motorcycle 1, and has a front part 2, a tail part 4 and a central part 3 comprised between the front part 2 and the tail part 4. The central part 3 is the part of the motorcycle 1 on which the rider's body resides arranged straddling the motorcycle 1 and/or sitting on the motorcycle 1 in a normal use and driving condition of the motorcycle 1. In the example, the central part 3 comprises a platform 35, an under-saddle support 36 and a front portion 37 of the saddle. In the example, the front part 2 comprises a front shield 21, a steering handlebar 22, a control dashboard 70, the front wheel 5, a braking device of the front wheel 51, a front mudguard 23, two direction indicators 62.

In the example, the rear part 4 comprises a rear portion 47 of the saddle, a parcel rack 45, one or two rear suspensions 41, the rear wheel 6, a braking device of the rear wheel 61, the traction engine 7, two direction indicators 64, a rear mudguard 43.

The motorcycle 1 comprises at least one headlight 12 fixed to the front part 2 and one tail light 14 fixed to the tail part 4 and directed in the opposite sense with respect to the headlight 12. In a situation in which the steering handlebar 22 is not turned, i.e. in the condition in which the front wheel 5 and the rear wheel 6 are aligned along the longitudinal axis L-L, the headlight 12 is such to emit an optical beam prevalently centered along the longitudinal axis L-L and directed towards a portion of the ground placed in front with respect to the motorcycle 1. The tail light 14 is such to emit a non-directional optical radiation, generally concentrated at the height of the tail light itself, in order to avoid possible dazzling of the vehicles which follow the motorcycle 1.

The motorcycle 1 further comprises a braking system 101 and a brake light 15.

The motorcycle 1 comprises at least one optical signaling device 15,64 fixed to the body of the motorcycle 2,3,4, arranged and oriented so as to be visible by a vehicle which follows the motorcycle 1, i.e. behind the motorcycle 1, and an electronic control unit 100 of the optical signaling device 15, 64, operatively connected to the optical signaling device 15, 64. According to a non-limiting embodiment, the aforesaid optical signaling device 15, 64 comprises the brake light 15 and/or the two rear direction indicators 64. According to an alternative non-limiting embodiment, the aforesaid optical signaling device 15, 64 could be an additional device with respect to the brake light 15 and/or the two rear direction indicators 64. Such optical signaling device may comprise one or more optical sources. According to a preferred non-limiting embodiment, the optical signaling device comprises both the brake light 15 and the two rear direction indicators 64.

The brake light 15 comprises, for example, a LED or incandescent lamp, distinct from the lamp of the tail light 14. In an alternative embodiment, the brake light 15 is integrated in the bulb or the tail light 14, the latter comprising, for example, a dedicated filament intended to work as brake light.

The brake light 15 and the tail light 14 are, for example, integrated in a same light cluster, named rear light cluster, fixed to the tail part 4 of the motorcycle body 2,3,4.

The motorcycle 1 comprises an obstacle sensor 52 fixed to the motorcycle body 2,3,4 and operatively connected to the electronic control unit 100. The electronic control unit 100 is adapted and configured to receive at least one output signal supplied by the obstacle sensor 52 and/or by the collision risk sensor 54, verifying whether said output signal meets at least one logical activation condition and, in such case, turning on the optical signaling device, i.e. in the non-limiting example described here both the brake light 15 and the rear direction indicators 64, to signal the collision risk with the motorcycle 1 to a vehicle with follows the motorcycle 1, i.e. to a vehicle behind. The expression "signaling to a vehicle" must not be interpreted as restrictive in the sense of "to a single vehicle" because the signaling may also be detected by multiple vehicles behind, if there are more than one.

The aforesaid activation logic condition is, for example, a logical condition representative of a situation which either exposes or would expose the motorcycle 1 to a collision risk with a vehicle which follows the motorcycle 1, in particular to a risk of rear-end collision, and may be due to various factors. Such factors are, for example, the presence of a fixed obstacle placed in front of the motorcycle 1 along the carriageway traveled by the motorcycle 1, such as for example material scattered on the carriageway, the presence of foreign objects, such as for example a fallen tree, a rock or a landslide, one or more vehicles stopped for an accident, one or more slow moving vehicles preceding the motorcycle 1, for example due to a queue or very slow traffic, one or more decelerating vehicles, fixed or slow moving works on the carriageway, an animal or group of animals, a pedestrian, a cyclist or a group of cyclists. Regardless of the presence of obstacles placed in front with respect to the motorcycle 1 and at given distance from the motorcycle 1, e.g. less than or equal to 100 meters or 200 meters, such condition may be, for example, a significant positive difference of speed or acceleration between the vehicle which follows the motorcycle and the motorcycle, a difference of distance smaller than a threshold distance between the vehicle which follows the motorcycle, also in relation to the speed and/or to the deceleration of the motorcycle. The aforesaid threshold distance is, for example, equal to 100 meters or 200 meters. The aforesaid logical activation condition may be, for example, a condition logically encoded in the electronic control unit 100 or in a program memory of the electronic control unit 100. The aforesaid logical condition may also be a condition expressed logically as any combination of two or more logical conditions indicated above.

Figure 3:
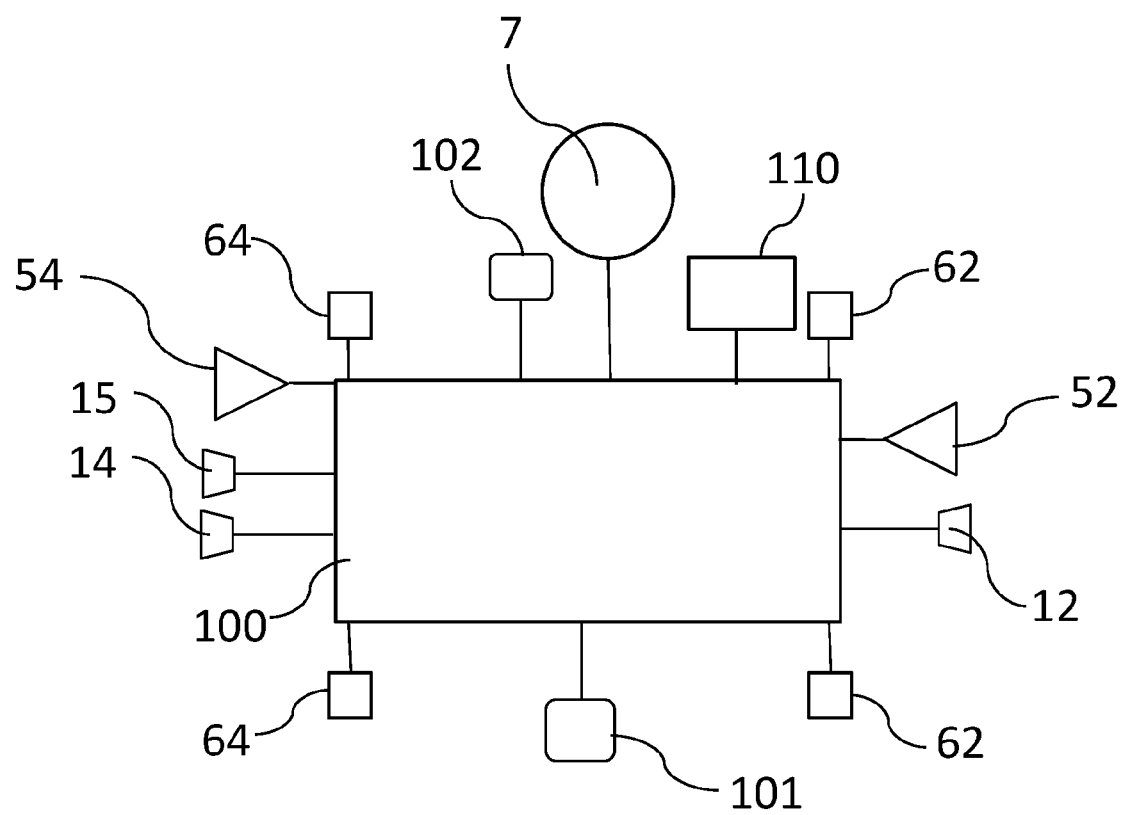
FIG. 3 shows a functional block chart of an embodiment provided by way of example of an electronic control system of the motorcycle in FIG. 1.

According to a preferred, but not limiting embodiment, the electronic control unit 100 is the ECU (Engine Control Unit) of the motorcycle 1 and is such to control also the traction engine 7 of the motorcycle 1. In the example in FIG. 3, the electronic control unit 100 is also such to control other devices of the motorcycle 1, such as, for example, the headlight 12 and the tail light 14, the front direction indicators 62.

According to an advantageous embodiment, the electronic control unit 100 is such as to intermittently turn on the optical signaling device 15,64. If the aforesaid optical signaling device comprises multiple devices, such as for example the brake light 15 and the two rear direction indicators 64, it may be advantageous to light up such devices in intermittent and mutually offset manner, e.g. out of phase. For example, it is possible to light both rear direction indicators 64 in mutually simultaneous and intermediate manner out of phase with respect to the lighting of the brake light 15.

According to an advantageous embodiment, the aforesaid intermittent lighting of the optical signaling device 15,64 has a duty cycle with a light-on time different from the light-off time. Preferably, the light-on time is either double or half of the light-off time. For example, the light-on time is equal to 1 second and the light-off time is equal to 0.5 seconds.

According to an advantageous embodiment, the obstacle sensor 52 comprises at least one of the devices on the following list: a radar, a telemeter, an optical sensor, an acoustic sensor, a camera, a CCD (Charge Coupled Display).

According to an advantageous embodiment, the obstacle sensor 52 and the electronic control unit 100 are adapted and configured to detect and recognize an optical signal emitted frontally with respect to the motorcycle 1, e.g. a luminous optical signal due to the lighting of a brake light of the vehicle which precedes the motorcycle 1 and/or due to the lighting of one or more hazard lights emitted by a vehicle which precedes the motorcycle 1 and/or the lighting of a stop light (red) or of a caution light (amber) of the traffic light placed frontally with respect to the vehicle. According to an embodiment, the electronic control unit is such to analyze the aforesaid light optical signal to distinguish it on the basis of one or more of the following parameters:

Intensity;
Position with respect to the sensitivity area of the sensor;
Color of the source;
Sequence or onset of the light (useful to eliminate fixed light sources, such as street lights or tail lights of the preceding vehicles);
Morphology of the source, also with respect to the surrounding environment.

This may be achieved, for example, when the obstacle sensor 52 either is or comprises a camera or a CCD (Charge Coupled Device).

Preferably, the analysis logic of the electronic control unit is also developed by means of self-learning techniques, feeding the system with positive and negative examples.

If the aforesaid optical signaling device 15,64 comprises the brake light 15, the electronic control unit 100 is operatively connected to the brake light 15 and is also adapted to light the brake light 15 when the braking system 101 is activated and to switch off the brake light 15 when the braking system is deactivated 101. Said activation of the braking system 101 may be automatic or occur as a result of a force applied by the driver to a brake lever 10 and/or to a brake pedal. In the particular example shown in the figures, the motorcycle 1, being a scooter, comprises two brake levers 10 constrained to the steering handlebar 22, one of which is associated with the braking device of the front wheel 51 and the other is associated with the braking device of the rear wheel 61. In a variant embodiment, the motorcycle 1 could be a motorcycle having an actuating lever of the clutch instead of the one of the brake levers 10, and in this case the motorcycle 1 would be provided with a brake pedal. In any one of the embodiments described above in which the optical signaling device 15,64 includes the brake light 15, the embodiment in which the electronic control unit 100 is such to turn on the brake light 15 when the aforesaid logical activation condition is detected, regardless of the activation and deactivation of the braking system 101, is advantageous.

For example, the electronic control unit 100, as also the optical signaling device 15,64, are also powered by a battery 110 of the motorcycle 1.

The obstacle sensor 52 is arranged and oriented so that the output signal supplied by the electronic control unit 100 carries information correlated to the presence of obstacles (including vehicles of light traffic signals) placed in front of the motorcycle, e.g. correlated to the presence of obstacles in an area of the carriageway traveled by the motorcycle placed in front of the motorcycle. Preferably, the obstacle sensor 52 is arranged on the front part 2 of the motorcycle body 2,3,4. In the example of the figures, it is placed on the steering handlebar 22, but could also be arranged on the front shield 21 or on the front part of the fairing of a motorcycle other than a scooter.

According to an advantageous embodiment, the electronic control unit 100 is adapted and configured to compare the speed of the motorcycle 1 with a first threshold speed and turn on the optical signaling device 14 only if the speed of the motorcycle 1 is higher than the first threshold speed. For this purpose, for example, with reference to FIG. 3, the electronic control unit 100 is such to receive an electrical signal carrying information correlated with the speed of the motorcycle 1, for example from a speed sensor 102 envisaged aboard the motorcycle 1 or operatively connected to it. According to a non-limiting embodiment, the first threshold speed is higher than or equal to 5 km/h. However, the first threshold speed may be 0 km/h, i.e. meaning that the optical signaling device is activated when the motorcycle 1 is stationary.

If the motorcycle 1 comprises a collision risk sensor 54, preferably such collision risk sensor is arranged and oriented so that the output signal carries information related to the collision risk with said vehicle or vehicles which follow the motorcycle 1. Preferably, the collision risk sensor 54 is arranged on the tail part 4 of the motorcycle body 2,3,4. In the example of the figures, it is fixed to the rear mudguard 43, but it could be arranged in another position, e.g. fixed to a license plate holder or integrated in the rear light cluster. Again if the motorcycle comprises the collision risk sensor 54, according to a further embodiment, the electronic control unit 100 is configured to activate the horn of the motorcycle 1, in addition to turning on the optical signaling device 14, 64 if it detects that the speed of the motorcycle 1 is either slower than or equal to a second threshold speed. According to a preferred and non-limiting embodiment, the second threshold speed is higher than or equal to 3 km/h, e.g. equal to 0 km/h.

According to a further embodiment, after an activation of the optical signaling device 15,64, the electronic control unit 100 is adapted and configured to automatically turn off the optical signaling device 15,64 if it detects that at least one logical deactivation condition is met. For example, such logical deactivation condition logic is met if a time interval has elapsed. For example, such time interval is either higher than or equal to 3 seconds. Preferably, such time interval is a time interval counted starting from when the electronic control unit 100 detects that said logical activation condition which determined the turning on of the optical signaling device 15,64 is met or from when any other logical activation condition for which the electronic control unit 100 is configured to turn on the optical signaling device 15,66 is no longer met. Other examples of logical deactivation conditions are, singularly or in mutual combination and/or in combination with the deactivation logic conditions described above: detecting an acceleration of the motorcycle 1 higher than a threshold acceleration and/or detecting a speed of the motorcycle 1 higher than a threshold speed and/or a positive speed difference of the motorcycle 1 exceeding a threshold difference, calculated with respect to the speed of the motorcycle 1 when the logical activation condition occurred.

In further embodiment variants, in addition to activating the optical emergency signaling device 15, 64 described above, the electronic control unit 100 can also turn on other signaling devices, such as for example the two front direction indicators 62. Furthermore, additional signaling devices (acoustic, optical or tactile) 75, 76 can be envisaged which inform the driver of the motorcycle 1 of the presence of a frontal obstacle (for example, a dedicated graphic warning indicator or warning light 75 on the dashboard 70) and/or of the risk of collision with a vehicle behind (for example a dedicated graphic indicator or warning light 76 on the control dashboard 70).

On the basis of the explanation above, it is thus possible to understand how a motorcycle 1 of the type described above makes it possible to achieve the purposes indicated above with reference to the prior art. Indeed, driving safety can be significantly increased by providing an obstacle sensor and/or a collision sensor.

Notwithstanding the principle of the disclosure, embodiments and details may be greatly varied with respect to that described and illustrated herein exclusively by way of non-limiting example without because of this departing from the scope of protection of the disclosure as defined in the appended claims.

The invention claimed is:
1. A motorcycle, comprising:
a motorcycle body having a front part, a tail part and a central part comprised between the front part and the tail part;
at least two wheels, constrained to the motorcycle body, comprising a front wheel and a rear wheel;
a traction engine, constrained to the motorcycle body and operatively connected to at least one of the wheels;
at least one optical signalling device fixed to the motorcycle body, arranged and oriented so as to be visible by a vehicle that is following the motorcycle; wherein the at least one optical signalling device is a brake light and/or two rear direction indicators;
additional signalling devices other than brake light and/or two rear direction indicators;
an electronic control unit operatively connected to the optical signalling device and to the additional signalling devices;
an obstacle sensor fixed to the motorcycle body and operatively connected to the electronic control unit;
wherein the electronic control unit is adapted and configured to receive at least one output signal supplied by the obstacle sensor, verifying whether said output signal meets at least one logical activation condition and, in such case, turning on the additional signalling devices to inform the driver of the motorcycle of the presence of a frontal obstacle; and
wherein the obstacle sensor is arranged on a steering handlebar or on a front shield or fairing of the motorcycle and is oriented so that the output signal supplied to the electronic control unit carries information correlated to the presence of obstacles placed in front of the motor cycle;

further comprising a collision risk sensor arranged and oriented so that an output signal carries information related to the collision risk with vehicle/s following the motorcycle, and the electronic control unit is adapted and configured to turn on the at least one optical signalling devices to inform the driver of the motorcycle of the presence of a risk of collision with a vehicle behind;

wherein the collision risk sensor is fixed to a rear mudguard, or to a license plate holder, or integrated in a rear light cluster;

wherein the additional signalling devices is of an acoustic, optical or tactile type;

wherein the obstacle sensor includes a radar;

wherein, after turning on the signalling devices, the electronic control unit is adapted and configured to automatically turn off the signalling devices if it detects that at least one logical deactivation condition is met;

wherein said logical deactivation condition is met if:
a time interval has elapsed; wherein said time interval is a time interval counted starting from when the electronic control unit detects that said logical activation condition is no longer met; or a positive speed difference of the motorcycle exceeding a threshold difference, calculated with respect to the speed of the motorcycle when the logical activation condition occurred.

2. A motorcycle according to claim 1, comprising a horn and wherein the electronic control unit is configured to activate said horn in addition to turning the at least one optical signalling device if it detectsthat the speed of the motorcycle is either lower than or equal to a second threshold speed.

3. A motorcycle according to claim 2, wherein the second threshold speed is either lower than or equal to 3 km/h.

4. A motorcycle according to claim 1, wherein the electronic control unit configured to intermittently turn on th signalling devices.

5. A motorcycle according to claim 4, wherein said intermittent lighting of the signalling devices has a duty cycle with a light-on time different from the light-off time.

6. A motorcycle according to claim 5, wherein the light-on time is either double or half of the light-off time.

7. A motorcycle according to claim 1, wherein the obstacle sensor comprises a camera ora CCD.

8. A motorcycle according to claim 2, wherein the electronic control unit is adapted and configured to compare the speed of the motorcycle with a first threshold speed and activate the optical signalling device only if the speed of the motorcycle is greater than the first threshold speed.

9. A motorcycle according to claim 8, wherein the first threshold speed is either greater than or equal to 5 km/h.

10. A motorcycle according to claim 1, wherein the obstacle sensor and the electronic control unit are adapted and configured to detect and recognise an optical signalling emitted frontally with respect to the motorcycle.

11. A motorcycle according to claim 10, wherein said optical light signalling is due to the lighting of a brake light of a vehicle which precedes the motorcycle and/or due to the lighting of one or more hazard lights emitted by a vehicle which precedes the motorcycle and/or the lighting of a stop light or caution light emitted by a traffic light placed frontally with respect to the motorcycle.

* * * * *